Figure 1:
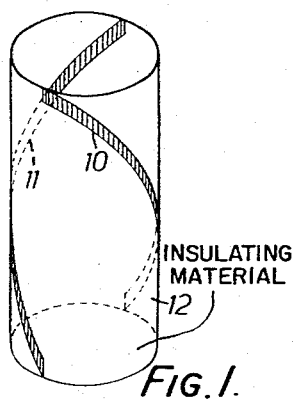

Dec. 5, 1967   L. M. BENNETT   3,356,942

FLUID DUCT AND ELECTRODE ASSEMBLY

Filed July 15, 1963

INVENTOR
LEONARD MYER BENNETT
BY
Irvin S. Thompson
ATTORNEY

United States Patent Office 3,356,942
Patented Dec. 5, 1967

3,356,942
FLUID DUCT AND ELECTRODE ASSEMBLY
Leonard Myer Bennett, Rodborough, Stroud, England, assignor to Mawdsley's Limited, Dursley, England
Filed July 15, 1963, Ser. No. 295,053
Claims priority, application Great Britain, July 21, 1962, 28,153/62
4 Claims. (Cl. 324—65)

This invention relates to electrode assemblies for use with a flowing liquid.

Electrode assemblies embodying two opposed electrodes between which in use a fluid flows, are used, for example, in conductivity measurements on the flowing liquid. Such an arrangement may be used for example with a concentration meter for measuring the concentration of suspended solids in the liquid, and present electrode arrangements for this purpose suffer from the disadvantage that inaccurate measurement can result when the fluid is non-homogeneous in the sense that the suspended solids are not uniformly distributed throughout the liquid. Flow conditions through the tube in which the electrodes are mounted can themselves result in a non-uniform distribution of the solids between the electrodes and hence inaccuracy in the concentration measurement.

The invention stems from the realisation that the error with known concentration meters is due to the fact that the current flowing between the opposed electrodes mainly passes through a small section of the fluid which is not representative of the total flow with a non-uniform solids distribution, and the object of the invention is to provide an electrode arrangement in which this error is materially reduced and can be substantially overcome.

According to the invention an electrode assembly for use with a fluid flow comprises two opposed electrodes on the surface of a tube through which the fluid flows, each electrode being skewed in the general direction of flow. Thus in use the current paths between different points along the length of the electrodes tend to pass across the flowing liquid in different directions and the total current is less susceptible to non-homogeneous liquid conditions.

The effect of the use of electrodes in accordance with the invention can be considered as analogous to scanning of the liquid flow, different portions of the electrodes "seeing" the flow from different angles so that the total current tends towards the value which would be obtained with a uniform conductance of the liquid. The electrodes are conveniently of helical form, and the pitch angle is preferably such that the bulk of the current will tend to flow across the liquid flow, and not in the direction of the fluid flow. Although the geometrical shape is not of vital importance each electrode for satisfactory results preferably spans about 220° around the flow axis. When using two electrodes of helical form the appearance thereof will be generally similar to that of a two-start screw thread.

Each electrode may be divided into small closely spaced and separately mounted sections which are electrically interconnected; for example, each electrode may be formed by a row of studs mounted in the wall of a tube along which the liquid flow occurs, with the studs of each electrode electrically connected externally of the tube. Such an arrangement is, in particular, easier to manufacture for a tube with large diameter than a continuous electrode, and it has the additional advantage that it provides an increased resistance between the electrodes while still providing the full scanning effect producing optimum results with the invention. In some cases, particularly with small diameter tubes, as few as three studs may be used for each electrode, spaced apart 120° around the tube axis.

It is necessary to ensure that the axial spacing or pitch of the electrodes is of reasonable dimension so that the bulk of the current between the electrodes travels across the flowing liquid and not between the electrodes in the direction of flow. Preferably the axial spacing between the electrodes is at least 1½ times their diametral spacing, which will normally be the diameter of a tube in which they are mounted, and if necessary the two electrodes may be relatively offset in the axial direction in order to provide or to increase the axial spacing.

Figure 2:
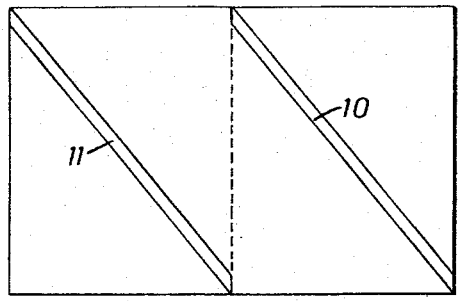
Figure 3:
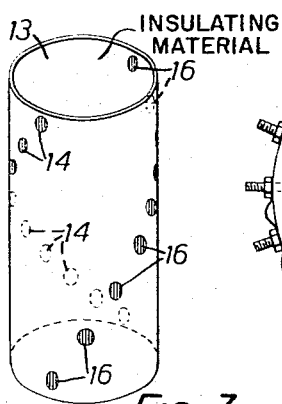
Figure 4:
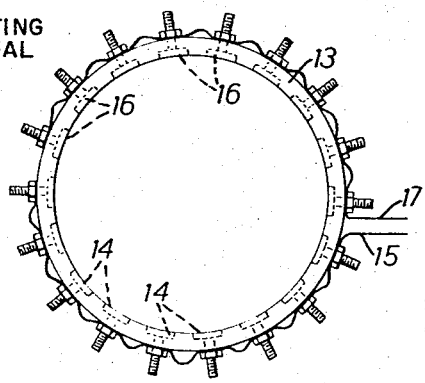
Figure 5:
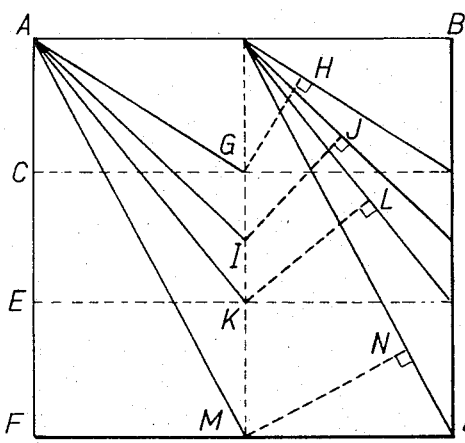
Figure 6:
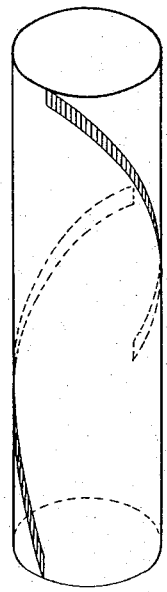

The invention may be performed in various ways and some specific embodiments will now be described by way of example with reference to the accompanying drawings in which FIGURE 1 is a perspective diagrammatic view of a pair of helical electrodes provided on the wall of a cylindrical tube, FIGURE 2 is a development of the wall of the tube of FIGURE 1 showing the two electrodes, FIGURE 3 is a perspective diagrammatic view of an alternative construction with electrodes in the form of separate studs, FIGURE 4 is an end view on an enlarged scale of the tube and electrodes of FIGURE 3, FIGURE 5 represents a development of the wall of a tube showing the effect of changes in pitch angle of helical electrodes, and FIGURE 6 is a diagrammatic perspective view illustrating the effect of axial displacement between two helical electrodes.

In the construction illustrated in FIGURE 1 two helical electrodes 10 and 11 are provided each extending around an angle of 180° at the central axis of the hollow tube 12 through which the fluid flows. The arrangement is such that from any point on one electrode the nearest point on the opposite electrode is by way of a path which substantially corresponds to a diameter of the tube, that is to say a path perpendicular to the direction of flow through the tube. This shortest distance is the path along which the current will tend to flow between the two specified points on the electrodes.

In the construction illustrated in FIGURES 3 and 4 each electrode comprises a series of spaced studs arranged generally along a helix subtending an angle of 160° at the axis of the tube 13. The tube itself is formed of an insulating material and each stud is provided with a head which lies flush with the internal surface of the tube and a shank which passes through the tube and has external securing means such as a nut to hold the stud in position, and also an electric terminal connection. One group of studs 14, forming one of the electrodes, are electrically connected together and to a common output terminal 15. The other group of studs 16 are similarly connected together electrically and to an output terminal 17.

In the development of a cylindrical wall illustrated in FIGURE 5 there are shown four possible variations of pitch of a pair of helical electrodes. The dimension AB represents the circumference of a cross-section of the tube, i.e. $\pi D$, where D is the diameter. Also $$AC = CE = EF = D$$

In the first example where the pitch of the electrodes AC is equal to their diameter the shortest distance GH between the electrodes, measured along the wall of the tube, is somewhat less than the diameter. In this example therefore the current may tend to flow along the wall of the tube and in a direction generally parallel with the direction of flow of the fluid. This is unsatisfactory.

In the second example illustrated in FIGURE 5 where the pitch of the electrodes is equal to 1.5 diameters the distance IJ between the electrodes as measured along the wall of the tube is approximately equal to, or slightly greater than, the diameter. As a result the current path will tend to lie across the tube.

In the third example where the pitch AE is equal to two diameters the distance KL between the electrodes is slightly greater than the diameter and the current will tend to flow across the tube. The same applies also in the third example where the pitch AF equals three diameters and the distance MN is substantially greater than one diameter.

In FIGURE 6 there is illustrated a construction with two helical electrodes, each subtending an angle of approximately 180° at the longitudinal axis. The electrodes are displaced axially relative to one another by a distance equal to approximately half the pitch, or total axial length of one electrode.

What is claimed is:

1. A fluid duct and electrode assembly, comprising a duct of tubular form with an internal electrical insulating surface, two symmetrically opposed and elongated electrodes mounted at said surface for electrical contact with fluid flow along the duct each electrode comprising a plurality of separate and discrete studs arranged in a row and electrically interconnected, and external electrical connections to said electrodes, the longitudinal axis of each electrode being skewed with respect to the longitudinal axis of the duct and the length of each electrode spanning a section of the length of the duct.

2. A fluid duct and electrode assembly, comprising a cylindrical duct of electrical insulating material, two opposed and elongated electrodes symmetrically arranged at an internal surface of the duct for electrical contact with fluid flow along the duct, each electrode comprising a plurality of separate and discrete studs arranged in a row and electrically interconnected, and external electrical connections to said electrodes, the longitudinal axis of each electrode being skewed in the general direction of the longitudinal axis of the duct and, in any lateral section of the duct which passes through the electrodes, being arranged at diametrically opposite positions at said surface.

3. An assembly according to claim 2, wherein each of said studs has a threaded shank passing through a corresponding counterbored radial bore through a wall of said duct, a head providing a contact surface and being inset in the counterbore so as to lie flush with the inner surface of said duct, and a retaining nut threaded on said shank externally of the duct.

4. A fluid duct and electrode assembly, comprising a duct in the form of a cylindrical tube of electrical insulating material, two opposed elongated electrodes each in the form of a plurality of electrically interconnected discrete studs arranged in a row and for electrical contact with fluid flow along the tube, a contact surface of each electrode stud being flush with an internal surface of the tube, and external electrical connections to said electrodes, the longitudinal axes of the electrodes being skewed with respect to the longitudinal axis of the tube and the length of each electrode spanning a section of the length of the tube, with any one of said studs of one electrode being diametrically opposed across the tube with respect to a corresponding one of said studs forming the other electrode.

References Cited
UNITED STATES PATENTS

| | | | |
|---|---|---|---|
| 2,440,044 | 4/1948 | Greenslade | 324—64 |
| 2,659,048 | 11/1953 | Zabel et al. | 324—65 |
| 3,014,858 | 12/1961 | Czuha | 204—195 |
| 3,028,546 | 4/1962 | Sproule | 324—30 |
| 3,240,693 | 3/1966 | Gardner | 204—195 |
| 3,246,235 | 4/1966 | Allsopp | 324—71 |

RUDOLPH V. ROLINEC, *Primary Examiner.*

WALTER L. CARLSON, *Examiner.*

C. F. ROBERTS, *Assistant Examiner.*